US012688090B2

(12) United States Patent　　　　　(10) Patent No.: US 12,688,090 B2
Moorthy et al.　　　　　　　　　　　(45) Date of Patent: Jul. 21, 2026

(54) FIRMWARE FAILURE REMEDIATION OPERATION TO FACILITATE A SUCCESSFUL INFORMATION HANDLING SYSTEM BOOT PROCESS

(71) Applicant: Dell Products L.P., Round Rock, TX (US)

(72) Inventors: Gowtham Moorthy, Namakkal (IN); Shekar Babu Suryanarayana, Bangalore (IN); Ranjan Kumar, Siliguri (IN)

(73) Assignee: Dell Products L.P., Round Rock, TX (US)

( * ) Notice: Subject to any disclaimer, the term of this patent is extended or adjusted under 35 U.S.C. 154(b) by 72 days.

(21) Appl. No.: 18/421,128

(22) Filed: Jan. 24, 2024

(65) Prior Publication Data

US 2025/0238326 A1　　Jul. 24, 2025

(51) Int. Cl.
　G06F 11/14　　　　(2026.01)
　G06F 9/4401　　　(2018.01)
(52) U.S. Cl.
　CPC ........ G06F 11/1417 (2013.01); G06F 9/4403 (2013.01); *G06F 2201/805* (2013.01)
(58) Field of Classification Search
　CPC .. G06F 11/1417; G06F 9/4403; G06F 9/4401; G06F 11/0793
　See application file for complete search history.

(56) References Cited

U.S. PATENT DOCUMENTS

| | | | |
|---|---|---|---|
| 2018/0004502 A1* | 1/2018 | Samuel ................ | G06F 9/4401 |
| 2020/0042391 A1* | 2/2020 | Pepper ............... | G06F 11/1417 |
| 2020/0278873 A1* | 9/2020 | Hsu ..................... | G06F 11/0751 |
| 2021/0240491 A1* | 8/2021 | Downum ............. | G06F 9/4406 |
| 2021/0286530 A1* | 9/2021 | Suryanarayana ... | G06F 21/6218 |
| 2021/0326208 A1* | 10/2021 | Liang ................. | G06F 11/0772 |
| 2022/0308963 A1* | 9/2022 | Pathan ............... | G06F 11/1469 |

OTHER PUBLICATIONS

List of Patents or Applications Treated as Related, Feb. 2024.

* cited by examiner

*Primary Examiner* — Yolanda L Wilson
(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS, the distributed BIOS including a BIOS component and a BIOS variable; identifying a processor environment installed on an information handling system from a plurality of processor environments; performing a boot process failure remediation operation, the boot process failure remediation operation applying a remedial solution to a boot process failure to facilitate successful completion of a boot process.

20 Claims, 8 Drawing Sheets

300

Figure 4B:
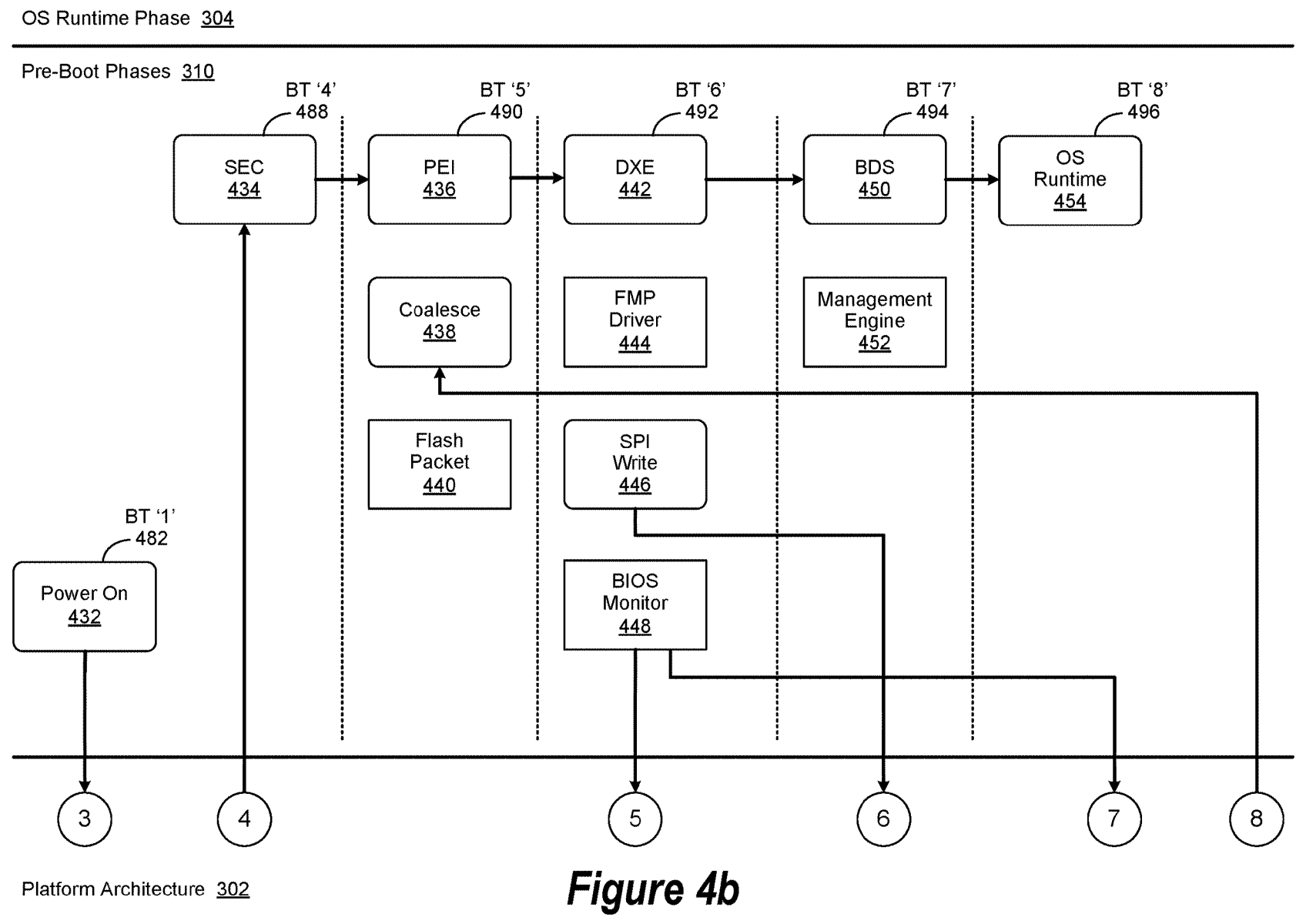

OS Runtime Phase 304

Pre-Boot Phases 310

BT '4'
488

SEC
434

BT '5'
490

PEI
436

BT '6'
492

DXE
442

BT '7'
494

BDS
450

BT '8'
496

OS
Runtime
454

Coalesce
438

Flash
Packet
440

FMP
Driver
444

SPI
Write
446

BIOS
Monitor
448

Management
Engine
452

BT '1'
482

Power On
432

Platform Architecture 302

Figure 4C:
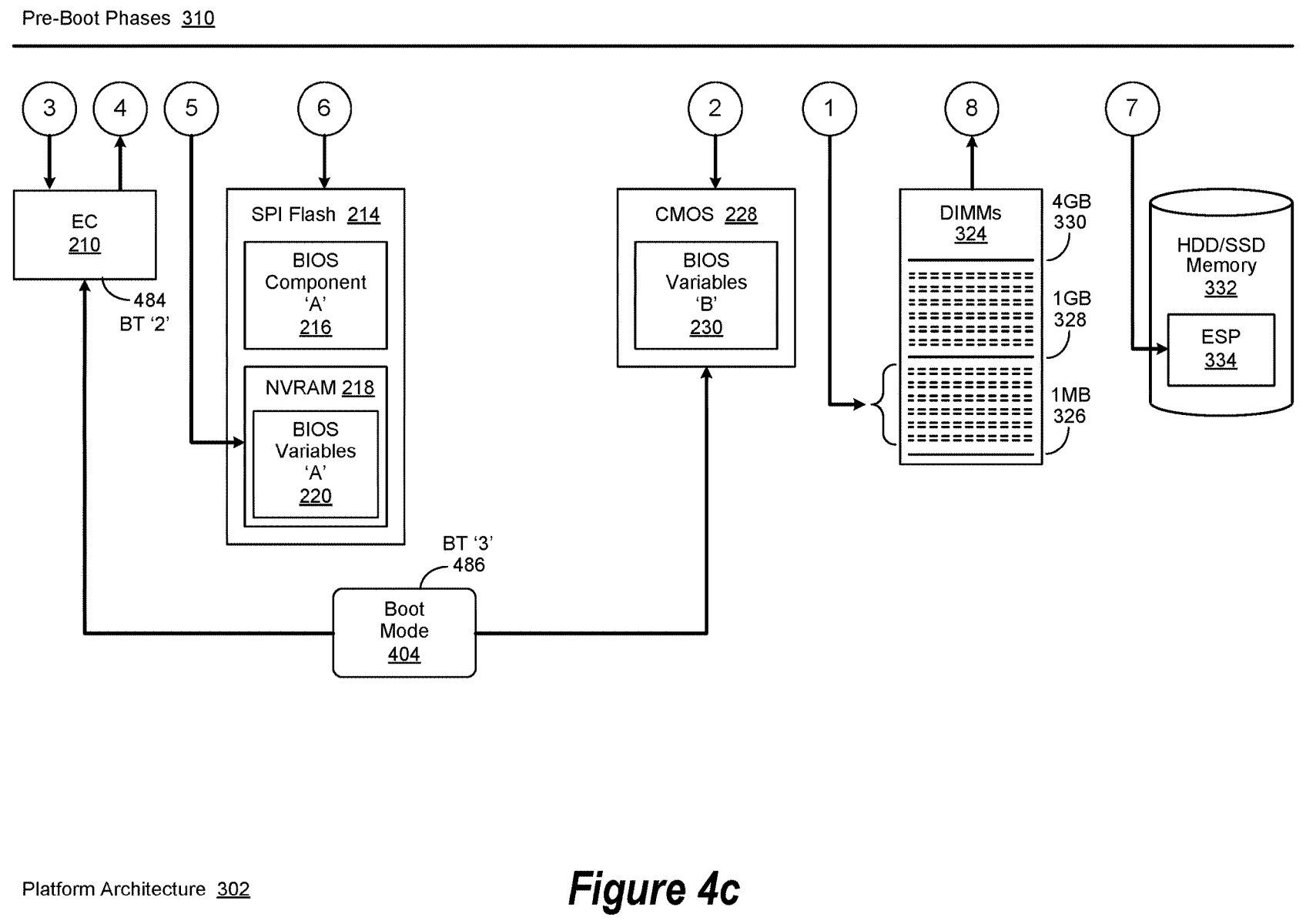

Pre-Boot Phases 310

HDD/SSD Memory 332

ESP 334

⑦

DIMMs 324

4GB 330

1GB 328

1MB 326

⑧

①

CMOS 228

BIOS Variables 'B' 230

②

SPI Flash 214

BIOS Component 'A' 216

NVRAM 218

BIOS Variables 'A' 220

⑥

⑤

EC 210

484 BT '2'

④

③

Boot Mode 404

Platform Architecture 302

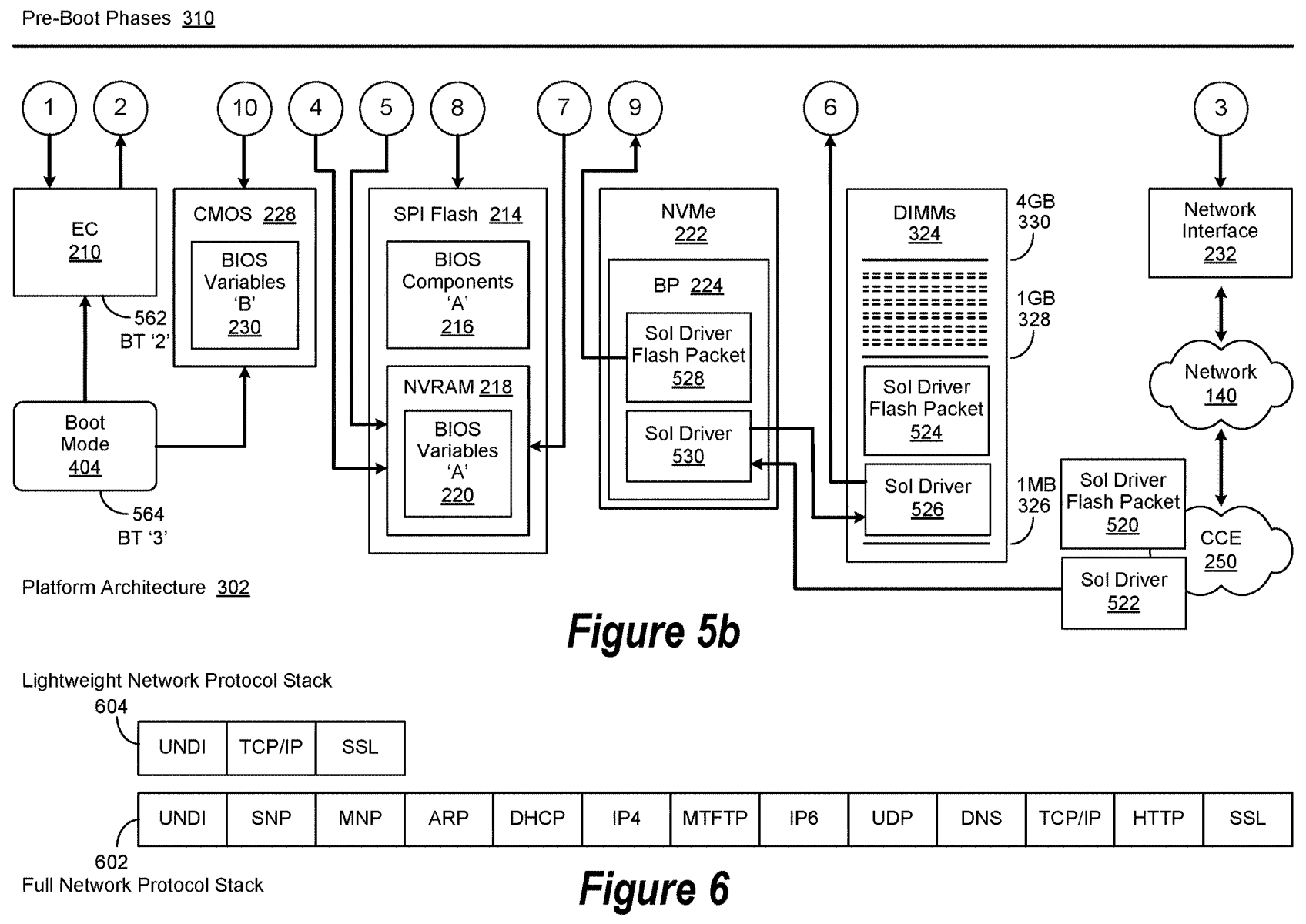

Pre-Boot Phases 310

③ → Network Interface 232 ↔ Network 140 ↔ CCE 250

Sol Driver Flash Packet 520

Sol Driver 522

4GB 330

1GB 328

DIMMs 324

Sol Driver Flash Packet 524

Sol Driver 526

1MB 326

⑥

NVMe 222

BP 224

Sol Driver Flash Packet 528

Sol Driver 530

⑨

⑦

SPI Flash 214

BIOS Components 'A' 216

NVRAM 218

BIOS Variables 'A' 220

⑧

⑤

④

CMOS 228

BIOS Variables 'B' 230

⑩

EC 210

562 BT '2'

Boot Mode 404

564 BT '3'

①

②

Platform Architecture 302

*Figure 5b*

Lightweight Network Protocol Stack

| UNDI | TCP/IP | SSL |
|---|---|---|

604

Full Network Protocol Stack

| UNDI | SNP | MNP | ARP | DHCP | IP4 | MTFTP | IP6 | UDP | DNS | TCP/IP | HTTP | SSL |
|---|---|---|---|---|---|---|---|---|---|---|---|---|

FIRMWARE FAILURE REMEDIATION OPERATION TO FACILITATE A SUCCESSFUL INFORMATION HANDLING SYSTEM BOOT PROCESS

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS, the distributed BIOS including a BIOS component and a BIOS variable; identifying a processor environment installed on an information handling system from a plurality of processor environments; performing a boot process failure remediation operation, the boot process failure remediation operation applying a remedial solution to a boot process failure to facilitate successful completion of a boot process.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS, the distributed BIOS including a BIOS component and a BIOS variable; identifying a processor environment installed on an information handling system from a plurality of processor environments; performing a boot process failure remediation operation, the boot process failure remediation operation applying a remedial solution to a boot process failure to facilitate successful completion of a boot process.

In another embodiment the invention relates to a computer-readable storage medium embodying computer program code, the computer program code comprising computer executable instructions configured for: providing an information handling system with a distributed BIOS, the distributed BIOS including a BIOS component and a BIOS variable; identifying a processor environment installed on an information handling system from a plurality of processor environments; performing a boot process failure remediation operation, the boot process failure remediation operation applying a remedial solution to a boot process failure to facilitate successful completion of a boot process.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a through 4c are a simplified block diagram showing the performance of certain distributed firmware management operations;

FIGS. 5a and 5b are a simplified block diagram showing the performance of firmware failure remediation operations to facilitate successful completion of a boot process; and FIG. 6 is a simplified block diagram of a lightweight network protocol stack.

DETAILED DESCRIPTION

Figure 1:
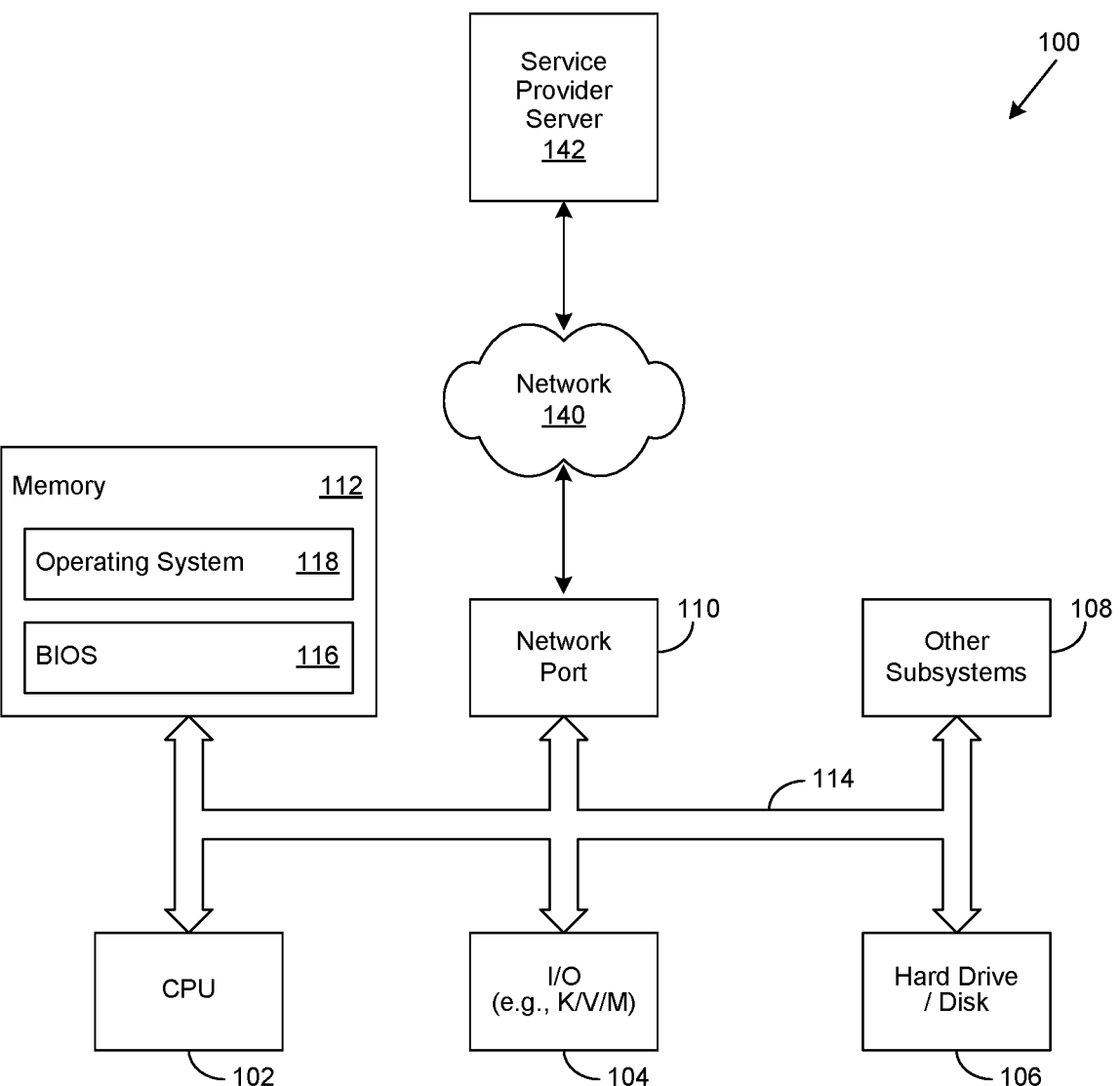
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that known approaches exist for addressing critical failures in early boot phases of an IHS, described in greater detail herein. One such example of such approaches is Error Correction Code (ECC), which detects and corrects errors in system memory. Another example is Auto Real Time Clock (RTC), which is a recovery mechanism that resets an IHS's BIOS to factory settings. Yet another example is Auto Recovery, which is an automatic recovery process that can repair a corrupted BIOS when the BIOS image integrity has failed during booting.

However, various aspects of the invention likewise reflect an appreciation that currently known auto heal methods are unable to correct irrecoverable errors occurring during the Pre Extensible Firmware Interface (EFI) Initialization (PEI) boot phase. For example, ECC is only able to heal single bit corruption in Serial Peripheral Interface (SPI) Flash memory, not multi bit corruption. As another example, current Auto RTC and Auto Recovery approaches are unable to recover a system that becomes hanged during the PEI boot phase due to programmatic or compatibility errors due to a recent BIOS update.

Likewise, various aspects of the invention reflect an appreciation that there is currently no known approach to dynamically locate a remedial solution and inject it into the boot path to enable a successful boot of an affected IHS. Accordingly, various aspects of the invention reflect an appreciation that an IHS may exhibit a NO Power On Self-Test (POST) or NO BOOT state when such approaches are not successful. Furthermore, various aspects of the invention reflect an appreciation that the main system board of an IHS may need to be replaced when such boot states are exhibited due to all of its hardware, including its SPI Flash memory, being fused for security reasons.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In certain embodiments, the firmware management operation may be performed during operation of an IHS 100. In various embodiments, performance of the firmware management operation may result in the realization of improved operation of an IHS 100.

Figure 2:
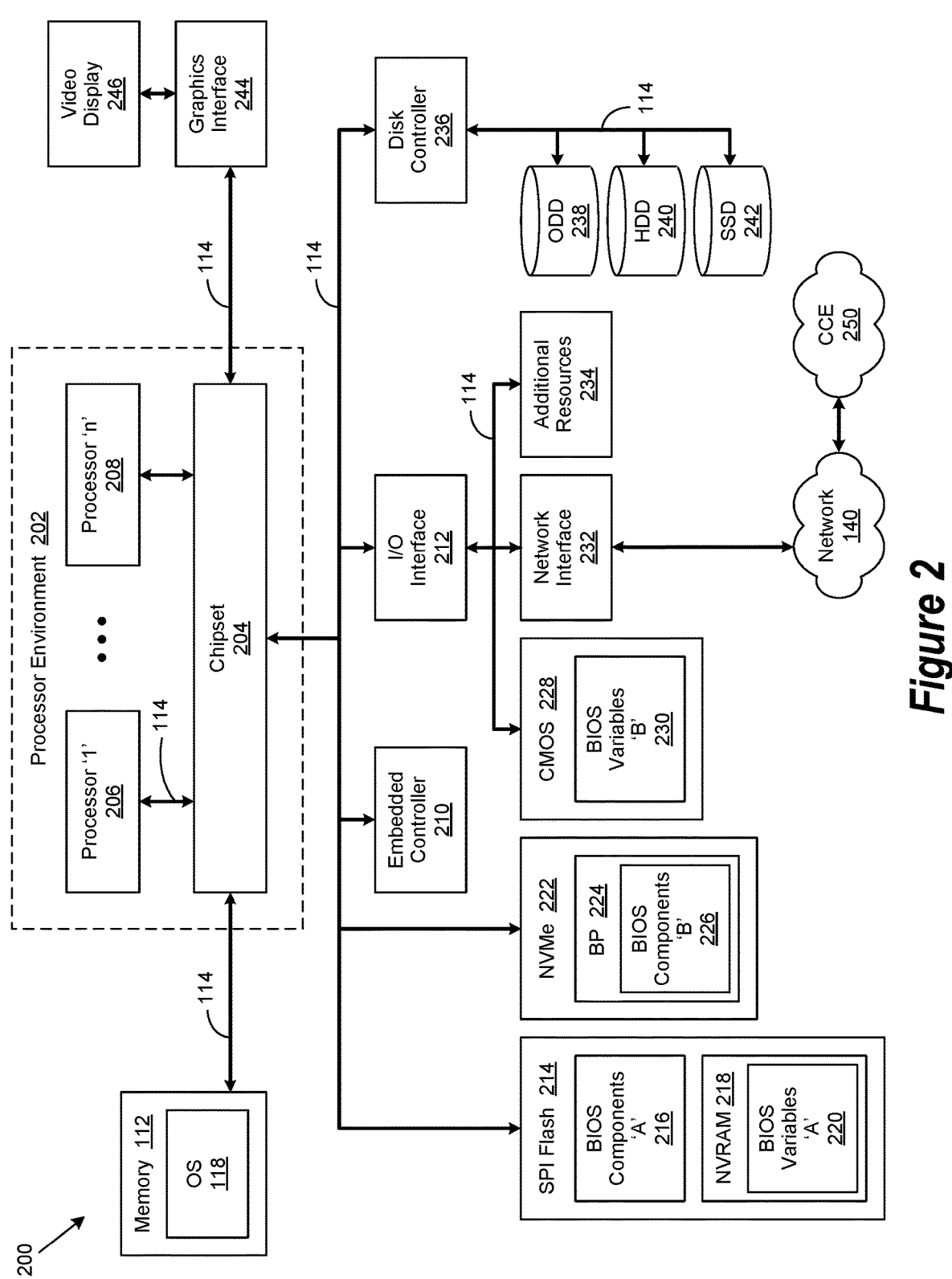
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
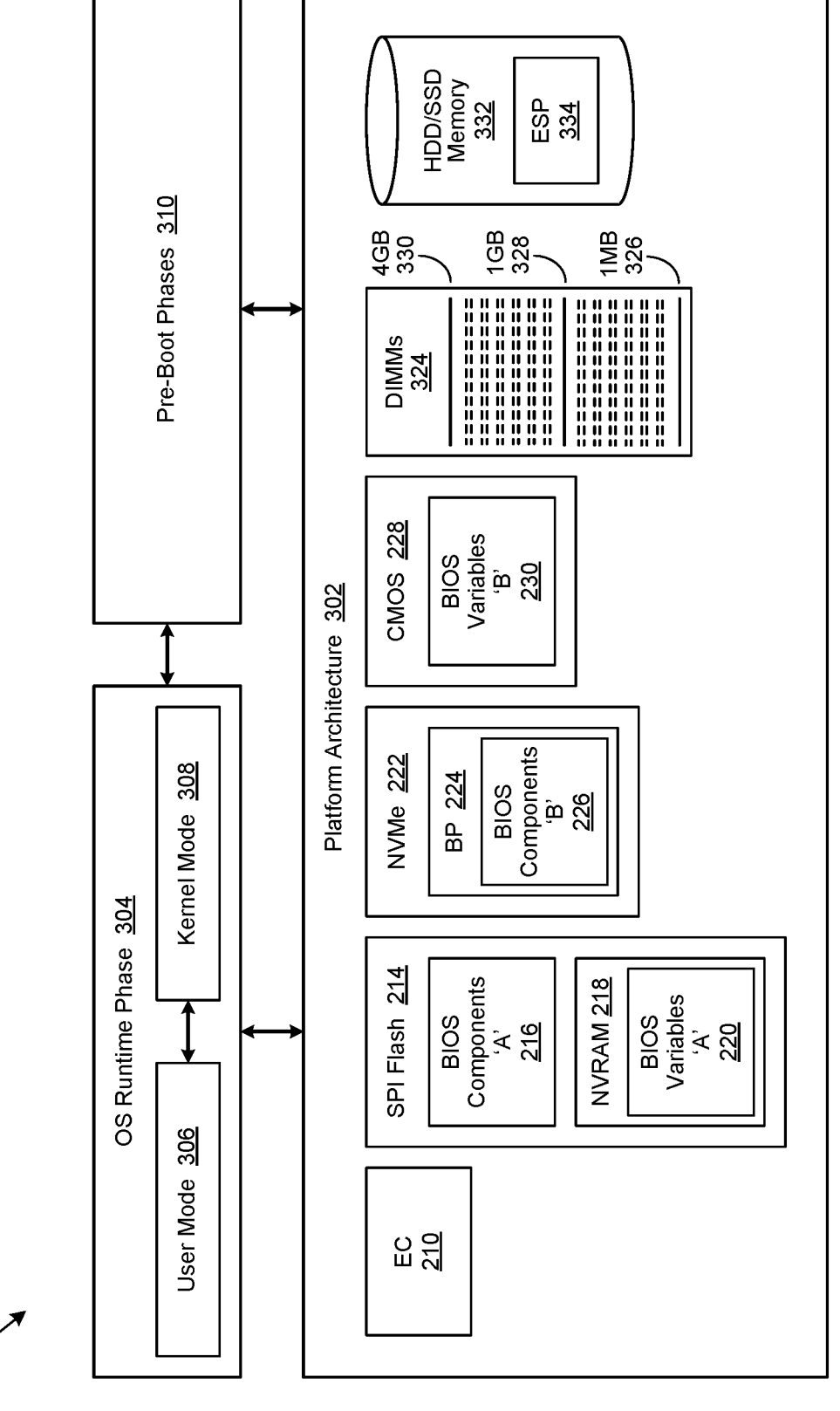
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom® Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, Serial Peripheral Interface (SPI) Flash 214 memory, Non-volatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
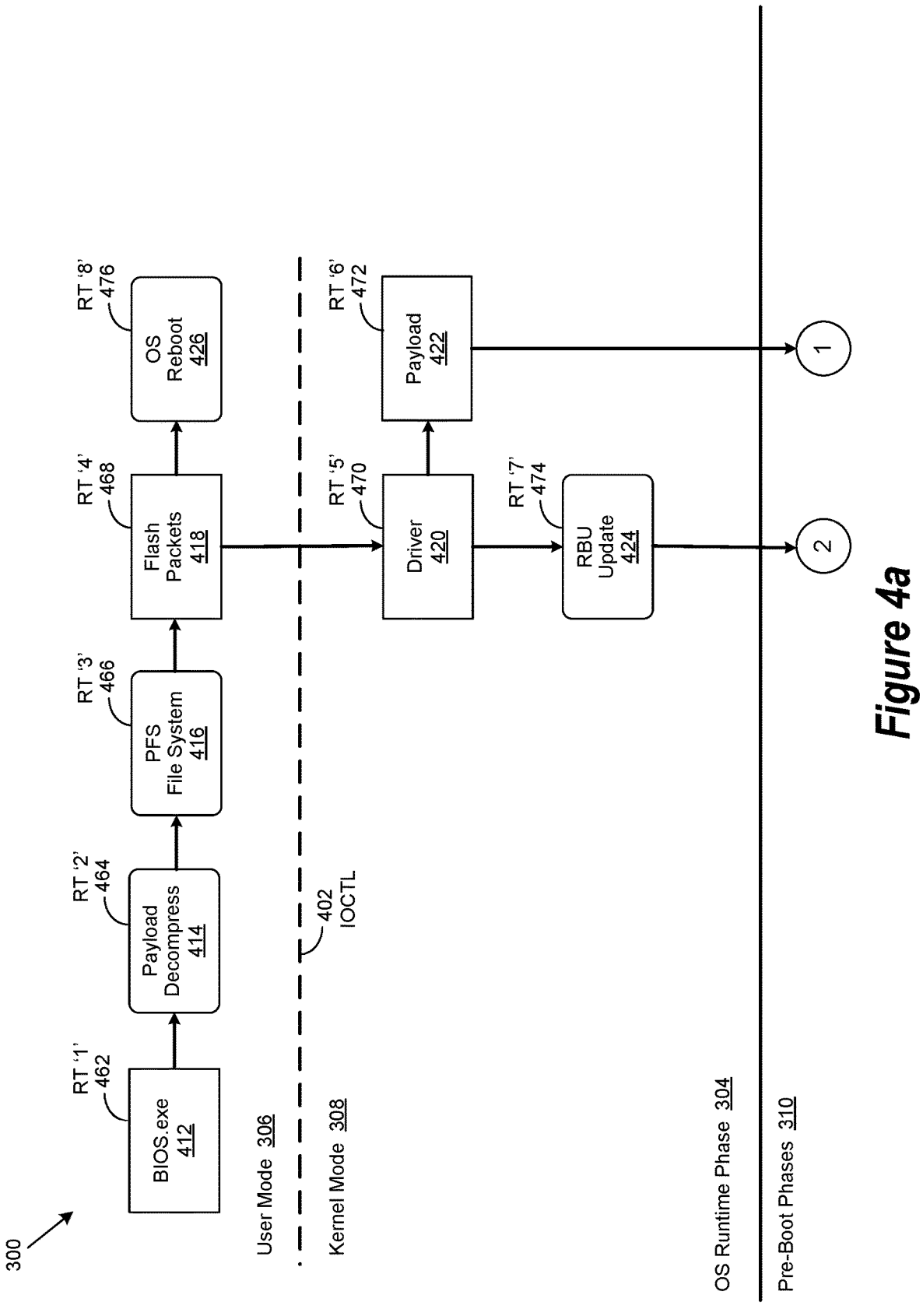

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1'. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver execution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
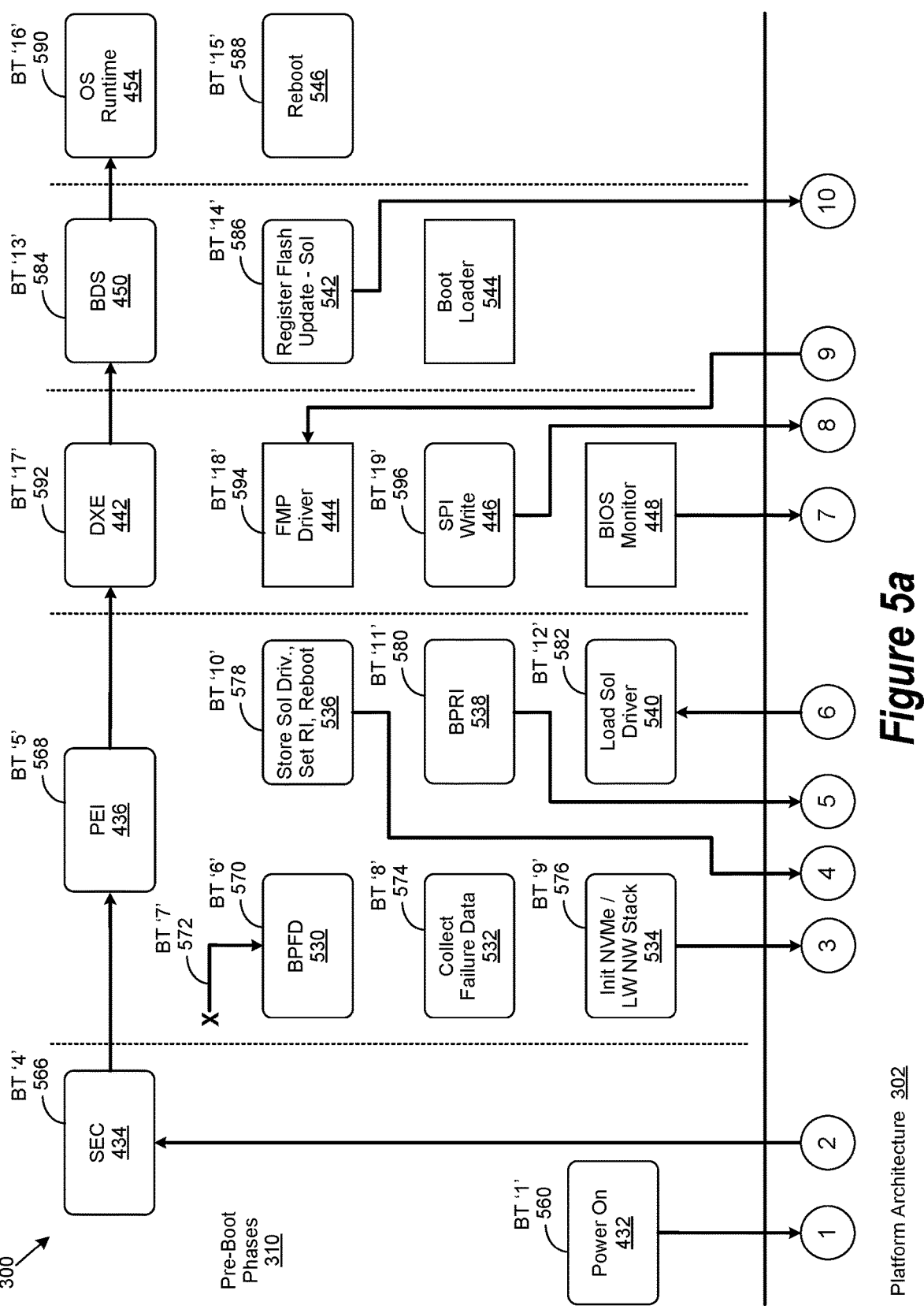

FIGS. 5a and 5b are a simplified block diagram showing the performance of firmware failure remediation operations implemented in accordance with an embodiment of the invention to facilitate successful completion of a boot process. In various embodiments, a distributed firmware management operation, described in greater detail herein, may be implemented to include one or more firmware failure remediation operations. As used herein, a boot process failure remediation operation broadly refers to any task, function, operation, procedure, or process performed, directly or indirectly, to monitor a boot process for the occurrence of a particular boot process failure, collect information related to such a failure, use the collected information to determine a remedial solution for the failure, and apply the remedial solution to the failure, or a combination thereof, to facilitate successful completion of the boot process.

In various embodiments, an architecture-specific distributed firmware management platform (ASDFMP) 300, described in greater detail herein, may be implemented to include various pre-boot phases 310 and a platform architecture 302. In various embodiments, as likewise described in greater detail herein, the platform architecture 302 may be implemented to include an embedded controller (EC) 210, System Peripheral Interface (SPI) Flash 214 memory, and Non-Volatile Memory express (NVMe) 222 memory, or a combination thereof. In various embodiments, the platform architecture may likewise be implemented to include a complementary metal-oxide-semiconductor (CMOS) 228 chip, one or more dual in-line memory modules (DIMMs) 324, and a network interface 232, or a combination thereof.

In various embodiments, the SPI Flash 214 memory may be implemented to receive, store, manage, and provide access to one or more BIOS components 'A' 216, described in greater detail herein. In various embodiments, the SPI Flash 214 memory may be implemented to include certain Non-Volatile Random Access Memory (NVRAM) 218, likewise described in greater detail herein. In various embodiments, the NVRAM 218 may in turn be implemented to receive, store, manage, and provide access to one or more BIOS variables 'A' 220, such as configuration settings, for use by the BIOS of an associated information handling system (IHS), described in greater detail herein.

In various embodiments, the NVMe 222 memory may be implemented to include a boot partition (BP) 224, described in greater detail herein. In various embodiments, the BP 224 may be implemented to receive, store, manage, and provide access to one or more solution driver flash packets 528, or one or more solution drivers 530, or a combination of the two, as described in greater detail herein. In various embodiments, the NVMe 222 memory may be implemented without a BP 224. Nonetheless, the NVMe 222 memory may be implemented in certain of these embodiments to still receive, store, manage, and provide access to one or more solution driver flash packets 528, or one or more solution drivers 530, or a combination of the two.

In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice. In various embodiments, the one or more DIMMs 324 may be implemented to receive, store, manage, and provide access to one or more solution driver flash packets 524, or one or more solution drivers 526, or a combination of the two. In certain of these embodiments, the one or more solution driver flash packets 524, or one or more solution drivers 526, or a combination of the two may be stored in a low region of memory, such as from 1 MB 326 to 1 GB 328.

In various embodiments, the network interface 232 may be implemented to provide access and connectivity to a network 140. In turn, the network 140 may be implemented in various embodiments to provide access and connectivity to a cloud computing environment (CCE) 250, described in greater detail herein. In various embodiments, the CCE 250 may be implemented to receive, store, manage, and provide access to one or more solution driver flash packets 520, or one or more solution drivers 522, or a combination of the two.

In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230. In various embodiments, one or more BIOS variables 'A' 220, and one or more BIOS variables 'B' 230, may be used, individually or in combination with one another, in the performance of a boot process failure remediation operation.

Referring now to FIG. 5*a*, boot process failure remediation management operations may be initiated by power being applied 432 to the ASDFMP 300 in pre-boot time (BT) step '1' 560. An embedded controller (EC) 210 may then be invoked in BT step '2' 562, which may result in the activation of a boot mode 404 in BT step '3' 564. In various embodiments, the boot mode 404 may be activated in BT step '3' 564 by retrieving, and using, certain BIOS variables 'B' stored in the CMOS 228 chip.

Thereafter, one or more security (SEC) 434 phase operations may then be performed in BT step '4' 566, followed by the performance of one or more Pre Extensible Firmware Interface (EFI) Initialization (PEI) 436 phase operations in BT step '5' 568. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 568 may include the implementation of a Boot Process Failure Detection (BPFD) 530 module in BT step '6' 570. In various embodiments, the BPFD 530 module may be implemented to operate as a service, familiar to skilled practitioners of the art.

In various embodiments, the BPFD 530 module may be used in the performance of a boot process failure remediation operation to monitor a boot process for the occurrence of a particular boot process failure, collect information related to such a failure, use the collected information to determine a remedial solution for the failure, and apply the remedial solution to the failure, or a combination thereof, to facilitate successful completion of the boot process, as described in greater detail herein. For example, the BPFD 530 module may be implemented in various embodiments to detect a failure of a particular boot process that may occur in BT step '7' 572. In various embodiments, the BPFD 530 module may be implemented BT step '8' to collect 532 data associated with such a boot process failure. In certain embodiments, the boot process failure occurs in an early boot phase of the boot process. In certain embodiments, the early boot phase includes a boot phase which occurs prior to a DXE boot phase. In certain embodiments, the boot process failure remediation operation remediates an early boot phase boot process failure. In certain embodiments, the collected information related to a boot process failure includes a failure error code (FEC). In certain embodiments, the failure error code is based upon the collected information related to the failure. In various embodiments, each of a plurality of boot process failures have an associated failure error code.

In various embodiments, the BPFD 530 module may be implemented in BT step '9' 576 to initiate NVMe 222 memory and a lightweight network communications stack 534, described in greater detail herein. In various embodiments, the lightweight network communications stack may be implemented such that it is capable of being executed from an exception handler (not shown) implemented within the ASDFMP 300. Once the lightweight network communications stack has been initiated, it may then be used by the BPFD 530 module to establish communications with the CCE 250, described in greater detail herein. In various embodiments, the BPFD 530 module may be implemented to provide the information it has collected that is related to a detected failure of a particular boot process to the CCE 250.

In various embodiments, a solution driver may be available for remediating the detected boot process failure. In various embodiments, the solution driver comprises a driver which may be used during a boot process to remediate a detected boot process failure. In these embodiments, the method used to determine whether such a solution driver is suitable for remediating a particular boot process failure, or where it may be stored, or how it might be provided to the BPFD 530 module, or a combination thereof, is a matter of design choice. In various embodiments, the BPFD 530 module may be implemented to retrieve a particular solution packet from the CCE 250 that may be used to remediate the detected boot process failure. In certain embodiments, the particular solution packet may be accessed via a respective failure error code, information generated using the failure error code, or a combination thereof.

In various embodiments, the solution packet stored within the CCE may be implemented to include a solution driver 522 and a solution driver flash packet 520. In various embodiments, the BPFD 530 module may be implemented in BT step '10' 578 to store 536 a copy of the retrieved solution driver 522 and solution driver flash packet 520 as solution driver 530 and solution driver flash packet 528 in the BP 224 of NVMe 222. Thereafter, the BPFD 530 module may be implemented in various embodiments to set a Remediation Injector (RI) flag and restart the ASDFMP 300.

In various embodiments, a Boot Process Remediation Injector (BPRI) 538 module may be implemented in BT step '11' 580. In various embodiments, the BPRI 538 module may be implemented to operate as a service, familiar to those of skill in the art. In various embodiments, the BPRI 538 module may be implemented at pre-boot to boot the ASDFMP 300 in a remediation injector boot mode of operation if it detects that the RI flag has been set.

If so, the BPRI 538 module may be implemented in various embodiments, to create a copy 526 of the solution driver 530 stored in the BP 224 of NVMe 222 memory in the DIMM 324 memory. In various embodiments, the BPRI 538 module may then be implemented in BT step '12' 582 to dispatch the copy 526 of the solution driver stored in DIMM 324 memory instead of a corresponding driver stored in SPI Flash 214 memory. In various embodiments, the ASDFMP 300 may be implemented to use the copy 526 of the solution driver in its boot process.

In various embodiments, use of the copy 526 of the solution driver during the boot process of the ASDFMP 300 may result in a successful boot process up until the Boot Device Selection (BDS) 450 phase in BT step '13' 584. If so, then a flash update may be registered 542 in BT step '14' 586 to use the solution driver flash packet 528 stored in the BP 224 of the NVMe 222 memory for the next boot of the ASDFMP 300. In various embodiments, a boot loader 544 may then be used to perform a reboot 546 operation in BT step '15' 586 to boot the ASDFMP 300 into an operating system (OS) runtime 454 state in BT step '16' 590.

In various embodiments, the ASDFMP 300 may be implemented during its next reboot to enter a flash update mode when it enters its Driver execution Environment (DXE) 442 phase in BT step 17 592. If so, then a Firmware Management Protocol (FMP) 444 driver may be implemented in various embodiments in BT step '18' 594 for use in the performance of a SPI write 446 operation in BT step '19' 596 to write the copy 526 of the solution driver to the SPI Flash 214 memory. In various embodiments, the RI flag may then be cleared and the ASDFMP 300 is rebooted yet again, this time using the copy 526 of the solution driver now stored in the SPI Flash 214 memory.

FIG. 6 is a simplified block diagram of a lightweight network protocol stack implemented in accordance with an embodiment of the invention. In various embodiments, certain network protocols corresponding to a lightweight network protocol stack 604 may be used in the performance of one or more firmware failure remediation operations. In various embodiments, the lightweight network protocol stack 604 may be derived from a full network protocol stack 602.

As an example, the full network protocol stack 602 shown in FIG. 6 includes Universal Network Device Interface (UNDI), Secure Network Programming (SNP), Microcom Networking Protocol (MNP), Address Resolution Protocol (ARP), Dynamic Host Configuration Protocol (DCP), Internet Protocol version 4 (IP4), Multicast Trivial File Transfer Protocol (MTFTP), Internet Protocol version 6 (IP6), User Diagram Protocol (UDP), Domain Name System (DNC), Transmission Control Protocol/Internet Protocol (TCP/IP), Hypertext Transfer Protocol (HTTP), and Secure Sockets Layer (SSL). To continue the example, the lightweight protocol stack 604 shown in FIG. 6 only includes Universal Network Device Interface (UNDI), Transmission Control Protocol/Internet Protocol (TCP/IP), and Secure Sockets Layer (SSL).

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

providing an information handling system with a distributed BIOS, the distributed BIOS including a BIOS component and a BIOS variable, the information handling system including an architecture-specific distributed firmware management platform, the architecture-specific distributed firmware management platform being implemented to accommodate architecture-specific aspects of the information handling system;

identifying a processor environment installed on an information handling system from a plurality of processor environments, the distributed BIOS being implemented to function with any of the plurality of processor environments;

performing a boot process failure remediation operation via the architecture-specific distributed firmware management platform, the boot process failure remediation operation monitoring a boot process for an occurrence of a particular boot process failure and applying a remedial solution to a boot process failure to facilitate successful completion of the boot process, the particular boot process failure occurring during an early boot phase of the boot process, the boot process failure remediation operation using a lightweight network stack to establish communications with a cloud computing environment, the boot process failure remediation operation retrieving a particular solution packet from the cloud computing environment, the particular solution packet being used by the boot process failure remediation operation to remediate the particular boot process failure, the particular solution packet including a solution driver and a solution driver flash packet.

2. The method of claim 1, wherein:

the boot process failure remediation operation collects failure information related to the particular boot process failure and uses the collected information to determine the remedial solution.

3. The method of claim 1, wherein:

the boot process failure remediation operation generates a failure error code associated with the particular boot process failure, the failure error code being based upon collected failure information related to the particular boot process failure.

4. The method of claim 1, wherein:

the boot process failure remediation operation accesses a boot process remediation injector module, the boot process remediation injector module being implemented to boot the information handling system in a remediation injector boot mode of operation.

5. The method of claim 4, wherein:

the boot process remediation injector module is implemented to create a copy of a solution driver.

6. The method of claim 5, wherein:

the copy of the solution driver is stored within a non-volatile memory.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing an information handling system with a distributed BIOS, the distributed BIOS including a BIOS component and a BIOS variable, the information handling system including an architecture-specific distributed firmware management platform, the architecture-specific distributed firmware management platform being implemented to accommodate architecture-specific aspects of the information handling system;

identifying a processor environment installed on an information handling system from a plurality of processor environments, the distributed BIOS being implemented to function with any of the plurality of processor environments;

performing a boot process failure remediation operation via the architecture-specific distributed firmware management platform, the boot process failure remediation operation monitoring a boot process for an occurrence of a particular boot process failure and applying a remedial solution to a boot process failure to facilitate successful completion of the boot process, the particular boot process failure occurring during an early boot phase of the boot process, the boot process failure remediation operation using a lightweight network stack to establish communications with a cloud computing environment, the boot process failure remediation operation retrieving a particular solution packet from the cloud computing environment, the particular solution packet being used by the boot process failure remediation operation to remediate the particular boot process failure, the particular solution packet including a solution driver and a solution driver flash packet.

8. The system of claim 7, wherein:

the boot process failure remediation operation collects failure information related to the particular boot process failure and uses the collected information to determine the remedial solution.

9. The system of claim 7, wherein:

the boot process failure remediation operation generates a failure error code associated with the particular boot process failure, the failure error code being based upon collected failure information related to the particular boot process failure.

10. The system of claim 7, wherein:

the boot process failure remediation operation accesses a boot process remediation injector module, the boot process remediation injector module being implemented to boot the information handling system in a remediation injector boot mode of operation.

11. The system of claim 10, wherein:

the boot process remediation injector module is implemented to create a copy of a solution driver.

12. The system of claim 10, wherein:

the copy of the solution driver is stored within a non-volatile memory.

13. A non-transitory, computer-readable storage medium embodying computer program code, the computer program code comprising computer executable instructions configured for:

providing an information handling system with a distributed BIOS, the distributed BIOS including a BIOS component and a BIOS variable, the information handling system including an architecture-specific distributed firmware management platform, the architecture-specific distributed firmware management platform being implemented to accommodate architecture-specific aspects of the information handling system;

identifying a processor environment installed on an information handling system from a plurality of processor environments, the distributed BIOS being implemented to function with any of the plurality of processor environments;

performing a boot process failure remediation operation via the architecture-specific distributed firmware management platform, the boot process failure remediation operation monitoring a boot process for an occurrence of a particular boot process failure and applying a remedial solution to a boot process failure to facilitate successful completion of the boot process, the particular boot process failure occurring during an early boot phase of the boot process, the boot process failure remediation operation using a lightweight network stack to establish communications with a cloud computing environment, the boot process failure remediation operation retrieving a particular solution packet from the cloud computing environment, the particular solution packet being used by the boot process failure remediation operation to remediate the particular boot process failure, the particular solution packet including a solution driver and a solution driver flash packet.

14. The non-transitory, computer-readable storage medium of claim 13, wherein:

the boot process failure remediation operation collects failure information related to the particular boot process failure and uses the collected information to determine the remedial solution.

15. The non-transitory, computer-readable storage medium of claim 13, wherein:

the boot process failure remediation operation generates a failure error code associated with the particular boot process failure, the failure error code being based upon collected failure information related to the particular boot process failure.

16. The non-transitory, computer-readable storage medium of claim 13, wherein:

the boot process failure remediation operation accesses a boot process remediation injector module, the boot process remediation injector module being implemented to boot the information handling system in a remediation injector boot mode of operation.

17. The non-transitory, computer-readable storage medium of claim 16, wherein:

the boot process remediation injector module is implemented to create a copy of a solution driver.

18. The non-transitory, computer-readable storage medium of claim 17, wherein:

the copy of the solution driver is stored within a non-volatile memory.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

\* \* \* \* \*